United States Patent
Tagawa

(10) Patent No.: US 10,635,157 B2
(45) Date of Patent: Apr. 28, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Keitaro Tagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 16/100,294

(22) Filed: Aug. 10, 2018

(65) Prior Publication Data

US 2019/0064912 A1 Feb. 28, 2019

(30) Foreign Application Priority Data

Aug. 24, 2017 (JP) ................................ 2017-160828

(51) Int. Cl.
*G06F 1/00* (2006.01)
*G06F 1/329* (2019.01)
*G06F 1/3287* (2019.01)

(52) U.S. Cl.
CPC ............ *G06F 1/329* (2013.01); *G06F 1/3287* (2013.01)

(58) Field of Classification Search
None
See application file for complete search history.

(56) References Cited

U.S. PATENT DOCUMENTS

| 2010/0037038 A1* | 2/2010 | Bieswanger | G06F 1/3203 712/220 |
| 2010/0095303 A1* | 4/2010 | Archer | G06F 9/505 718/105 |
| 2010/0138837 A1* | 6/2010 | Olsson | G06F 1/3203 718/102 |
| 2015/0379668 A1* | 12/2015 | Weissmann | G06F 9/5083 345/522 |
| 2016/0054783 A1* | 2/2016 | Rajappa | G06F 1/3234 700/291 |

FOREIGN PATENT DOCUMENTS

| JP | 2010-160565 | 7/2010 |
| JP | 2015-072588 | 4/2015 |

* cited by examiner

*Primary Examiner* — Nitin C Patel
(74) *Attorney, Agent, or Firm* — Fujitsu Patent Center

(57) ABSTRACT

An information processing apparatus configured to control a parallel computer system, the information processing apparatus includes a processor configured to determine a plurality of power supply control domains by dividing a plurality of computation nodes, acquire scheduling information that indicates an allocation state of one or more first jobs to the plurality of computation nodes, for each of the plurality of power supply control domains, identify, based on the scheduling information, a first number of the computation nodes each of which does not execute the one or more first jobs, receive a request to execute a second job, identify a second number of computation nodes each of which is to be used for processing of the second job, and control to turn on power supply to a first power supply control domain of the plurality of power supply control domains based on the first and second numbers.

17 Claims, 15 Drawing Sheets

| JOB ID | ALLOCATION TARGET NODE ID | SCHEDULED START TIME | SCHEDULED END TIME |
|---|---|---|---|
| 0 | 0x000 | 2/22 15:00 | 2/22 21:00 |
| 1 | 0x001 | 2/22 15:00 | 2/22 19:00 |
| 2 | 0x000,001,0x002 | 2/22 21:00 | 2/23 06:00 |

| JOB ID | ALLOCATION SHAPE |
|---|---|
| 3 | (3,3,1) |
| 4 | (4,2,2) |
| 5 | (5,5,5) |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-160828, filed on Aug. 24, 2017, the entire contents of which are incorporated herein by reference.

FIELD

The embodiment discussed herein is related to an information processing apparatus, a method and a non-transitory computer-readable storage medium.

BACKGROUND

In a computer system (HPC system) used for high performance computing (HPC), an energy saving function that reduces power consumption is demanded. With respect to the energy saving function included in this kind of HPC system, it is important not to lower the job throughput as much as possible while controlling power consumption.

As a conventional energy saving function in the HPC system, a method is known which refers to scheduling information created by a job scheduler to shut the power supply to a resource to which no job is allocated. It is to be noted that in the scheduling information, for example, an execution time of each job and an allocation target resource for an allocation destination of the job are defined.

Based on the scheduling information created by the job scheduler, power shutdown of a processor that is predicted to be in an idle state and power activation of a processor to which a job requested to be executed is allocated are performed. With this, energy saving in a system is achieved while controlling a job throughput from being lowered. Japanese Laid-open Patent Publication No. 2010-160565 and Japanese Laid-open Patent Publication No. 2015-72588 are examples of related art.

SUMMARY

According to an aspect of the invention, an information processing apparatus configured to control a parallel computer system including a plurality of computation nodes, the information processing apparatus includes a memory, and a processor coupled to the memory and configured to determine a plurality of power supply control domains by dividing the plurality of computation nodes, acquire scheduling information that indicates an allocation state of one or more first jobs to the plurality of computation nodes, for each of the plurality of power supply control domains, identify, based on the scheduling information, a first number of the computation nodes each of which does not execute the one or more first jobs, receive a request to execute a second job, identify a second number of computation nodes each of which is to be used for processing of the second job, and control to turn on power supply to a first power supply control domain of the plurality of power supply control domains based on the first number and the second number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a data configuration of a high-priority job entry notification in the parallel computer system as an example of the embodiment.

DESCRIPTION OF EMBODIMENT

In job scheduling in a large-scale computer system, there is a problem in that allocation of a computation node to a job takes a long time due to a reason that a network topology has to be considered or the like.

With this, for example, when a job with a degree of priority, with which the job does not have to be executed by stopping all other jobs under execution but has to be started with the highest priority among jobs waiting to be executed, (hereinafter, referred to as a high-priority job) is newly entered, this high-priority job is not be able to be processed quickly.

Furthermore, in an HPC system, in general, processing of power shutdown and power activation of a resource such as a computation node takes a processing time in unit of minute. This time for processing of power shutdown and power activation for a computation node may become an overhead to delay the start of execution of a job, causing a risk of lowering of a job throughput.

(A) Configuration

Figure 1:
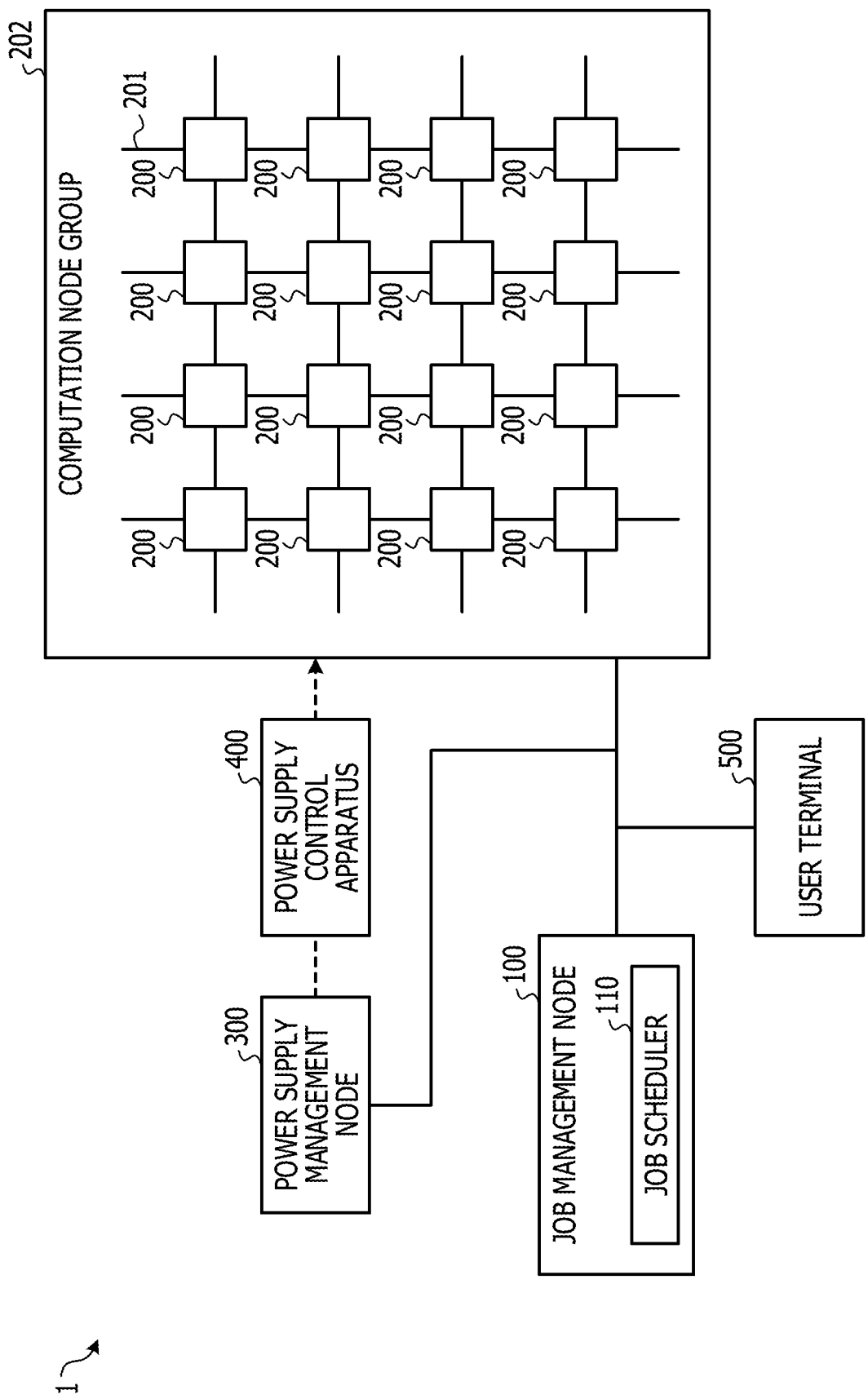
FIG. 1 is a diagram illustrating a configuration of a parallel computer system as an example of an embodiment.

FIG. 1 is a diagram illustrating a configuration of a parallel computer system 1 as an example of an embodiment.

As illustrated in FIG. 1, the parallel computer system 1 includes a computation node group 202, a job management node 100, a power supply management node 300, and a power supply control apparatus 400. Furthermore, a user terminal 500 is coupled to the parallel computer system 1. The user terminal 500 is an information processing apparatus. A job issued by this user terminal 500 is entered (input) to the job management node 100.

It is to be noted that in the example illustrated in FIG. 1, for the sake of convenience, one user terminal 500 is coupled to the parallel computer system 1. However, the embodiment is not limited thereto, and two or more user terminals 500 may be coupled.

In the computation node group 202, a plurality of computation nodes 200 are intercommunicably coupled via a network 201. With this, an N-dimensional interconnection network is formed (N is a natural number). Furthermore, the job management node 100 is coupled to the network 201.

The network 201 is a communication line, for example, a local area network (LAN) and an optical communication path.

(a) Computation Node 200

A computation node 200 is an information processing apparatus, and a plurality of computation nodes 200 included in the computation node group 202 has the same configuration.

The computation node 200 includes, for example, a processor, a memory, a storage apparatus, and a network interface, which are not illustrated, as constituent elements. Theses constituent elements are configured to be intercommunicable via a bus.

The memory is a storage memory including a read only memory (ROM) and a random access memory (RAM). In the ROM of the memory, a software program executed by the computation node 200 and various kinds of data for the software program are written. The software program in the memory is read as appropriate by a processor such as a central processing unit (CPU) to be executed. Furthermore, the RAM of the memory is used as a temporary storage memory or a working memory.

In the software program, a computation node control program executed by the processor for implementing a job calculation processing function in the computation node 200 may be included.

The storage apparatus is used as an auxiliary storage apparatus of the computation node 200 and is a hard disk drive (HDD) or a solid state drive (SSD), for example. In the storage apparatus, an operating system (OS) program, a software program, and various kinds of data are stored.

The network interface is coupled to the network 201. The network interface performs transmission and reception of data with other computers (the computation node 200, the job management node 100) or a communication apparatus via the network 201.

The processor performs overall control of the computation node 200. The processor may be a multi-processor. The processor may be any one of a CPU, a micro processing unit (MPU), a digital signal processor (DSP), an application specific integrated circuit (ASIC), a programmable logic device (PLD), or a field programmable gate array (FPGA), for example. Furthermore, the processor may be a combination of two or more types among the CPU, the MPU, the DSP, the ASIC, the PLD, and the FPGA.

It is to be noted that the computation node 200 implements the job calculation processing function according to the present embodiment by executing a program (computation node control program or the like) stored in a computer-readable non-transitory storage medium, for example. The program in which a processing content to be executed by the computation node 200 is written may be stored in various types of storage media. For example, a program to be executed by the computation node 200 may be stored in the storage apparatus. The processor loads at least part of the program inside the storage apparatus into the RAM and executes the loaded program.

Furthermore, the program to be executed by the computation node 200 (processor) may be stored in a non-transitory portable storage medium such as an optical disk, a memory apparatus, or a memory card. The program stored in the portable storage medium becomes executable after being installed in the storage apparatus under the control of the processor, for example. Furthermore, the processor may directly read the program from the portable storage medium and execute the read program.

Then, in the computation node 200, the processor executes the computation node control program, whereby the job calculation processing function is implemented.

The job calculation processing function performs control to execute a job. The job calculation processing function controls the start of execution, monitoring of the execution state, and the stop with respect to a job requested (instructed) to be executed (computed) by the job management node 100, which will be described later. It is to be noted that when the job management node 100 "makes a request to execute a job" to the computation node 200, this is referred to as "allocate a job" in some cases.

It is to be noted that various types of processing such as execution of a job in the computation node 200 may be implemented using a known method, and thus the detailed description thereof is omitted.

Furthermore, in the job calculation processing function, a processing result (calculation result) of a job may be transmitted via the network 201 to other computation node 200 or the user terminal 500 of a job requester, as demanded.

In the parallel computer system 1 according to the present embodiment, each of the computation nodes 200 corresponds to a node serving as a unit of job arrangement. The computation node 200 is simply referred to as a node 200 in some cases.

(b) Job Management Node 100

The job management node 100 receives the request to execute a job from the user terminal 500 or the like and performs control to cause one or more computation nodes 200 to execute a job, out of the plurality of computation nodes 200 included in the computation node group 202. It is to be noted that when the request to execute a job is received, it may be expressed that a job is entered.

The job management node 100 is a parallel processing control apparatus that allocates jobs to two or more computation nodes 200 and thereby causes two or more jobs to be processed in parallel.

The job management node 100 is an information processing apparatus and includes, for example, a processor, a memory, a storage apparatus, and a network interface, which are not illustrated, as constituent elements. These constituent elements are configured to be intercommunicable via a bus.

The memory is a storage memory including a ROM and a RAM. In the ROM of the memory, a software program executed by the job management node 100 and various kinds of data for the software program are written. The software program in the memory is read as appropriate by a processor such as a CPU to be executed. Furthermore, the RAM of the memory is used as a temporary storage memory or a working memory.

In the software program, a job management node control program executed by the processor for implementing a function as the job scheduler 110 in the job management node 100 may be included.

The storage apparatus is used as an auxiliary storage apparatus of the job management node 100 and is an HDD or an SSD, for example. In the storage apparatus, an OS program, a software program, and various kinds of data are stored.

The network interface is coupled to the network 201. The network interface performs transmission and reception of data with other computers (the computation node 200, the power supply management node 300) or a communication apparatus via the network 201.

The processor performs overall control of the job management node 100. The processor may be a multi-processor. The processor may be any one of a CPU, an MPU, a DSP, an ASIC, a PLD, or an FPGA, for example. Furthermore, the processor may be a combination of two or more types among the CPU, the MPU, the DSP, the ASIC, the PLD, and the FPGA.

It is to be noted that the job management node 100 implements the function as the job scheduler 110 by executing a program (job management node control program or the like) stored in a computer-readable non-transitory storage medium, for example. The program in which a processing content to be executed by the job management node 100 is written may be stored in various types of storage media. For example, a program to be executed by the job management node 100 may be stored in the storage apparatus. The processor loads at least part of the program inside the storage apparatus into the RAM and executes the loaded program.

Furthermore, the program to be executed by the job management node 100 (processor) may be stored in a non-transitory portable storage medium such as an optical disk, a memory apparatus, or a memory card. The program stored in the portable storage medium becomes executable after being installed in the storage apparatus under the control of the processor, for example. Furthermore, the processor may directly read the program from the portable storage medium and execute the read program.

Then, in the job management node 100, the processor executes the job management node control program, whereby the function as the job scheduler 110 is implemented.

The job scheduler 110 performs execution reservation (allocation) to the computation node 200 with respect to a job requested to be executed (submitted) by the user terminal 500 or the like. With respect to a processing target (allocation target) job, for example, the job scheduler 110 determines the computation node 200 (computation node resource) to be an allocation destination and also determines a time zone (scheduled start time, scheduled end time) in which the computation node 200 as this allocation destination is caused to execute this job.

The job scheduler 110 registers the contents thus determined in scheduling information (job schedule) 111 in an associated manner.

Figure 2:
FIG. 2 is a diagram illustrating scheduling information in the parallel computer system as an example of the embodiment.

FIG. 2 is a diagram illustrating the scheduling information 111 in the parallel computer system 1 as an example of the embodiment.

In the scheduling information 111 illustrated in FIG. 2, a job ID, an allocation target node identification (ID), the scheduled start time, and the scheduled end time are associated with each other.

The job ID is identification information that identifies a job. The allocation target node ID is identification information that identifies the computation node 200. The scheduled start time and the scheduled end time respectively indicate the scheduled start time and the scheduled end time of the time zone in which the job is to be executed.

Figure 10:
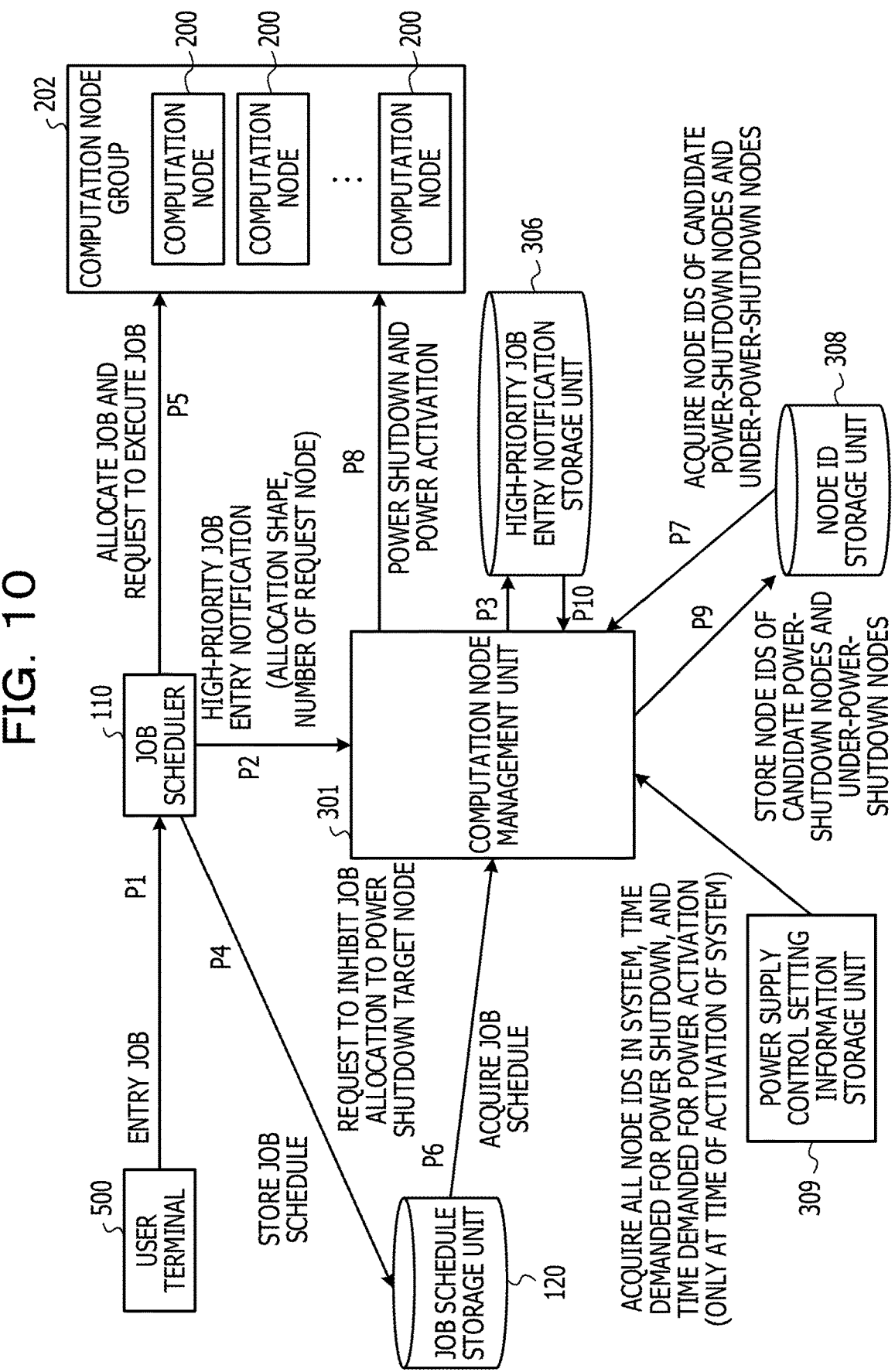
FIG. 10 is a diagram explaining information transmitted and received in the parallel computer system as an example of the embodiment.

The scheduling information 111 created by the job scheduler 110 is stored in a job schedule storage unit 120 (see FIG. 10).

The job schedule storage unit 120 is a storage region that stores therein the scheduling information 111 and implemented, for example, by using a storage region of the RAM or the HDD, which is not illustrated, in the job management node 100.

In this job schedule storage unit 120, access is made also from a computation node management unit 301 (see FIG. 6) which will be described later and readout of the scheduling information 111 is performed.

It is to be noted that the job schedule storage unit 120 may be provided in the outside of the job management node 100 and implemented, for example, by using a storage apparatus of the power supply management node 300 or a storage apparatus of other server apparatus, which is not illustrated.

Figure 3:
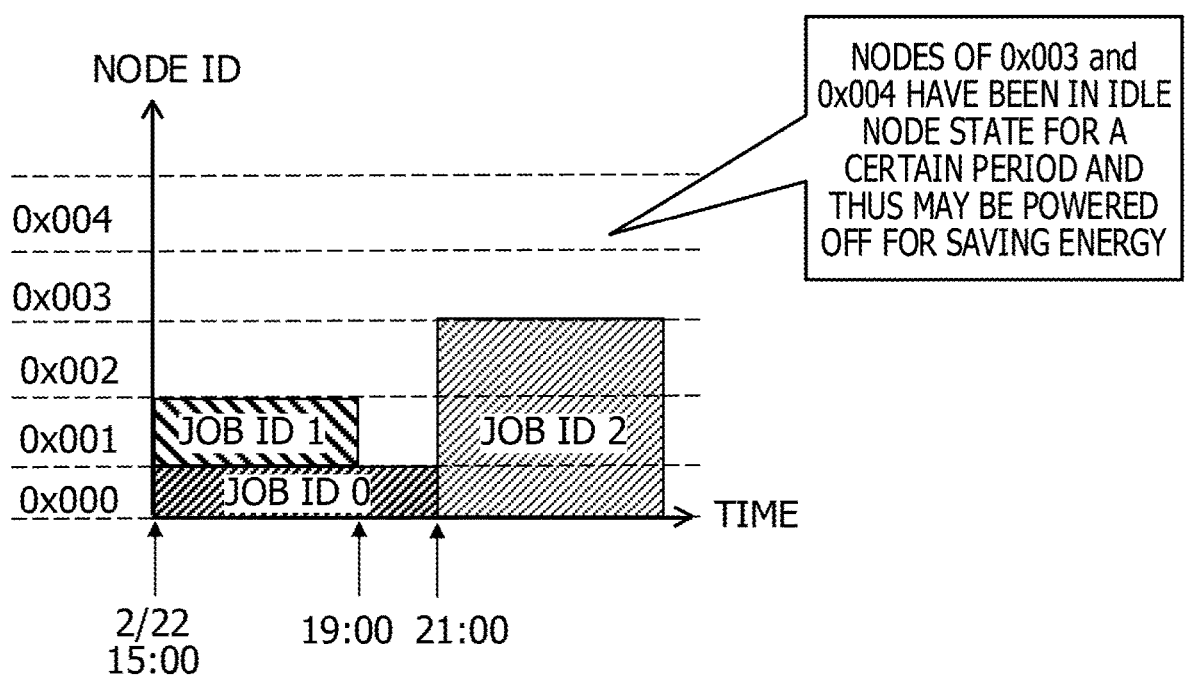
FIG. 3 is a diagram schematically illustrating job allocation to each node.

FIG. 3 is a diagram schematically illustrating job allocation to each of the computation nodes 200. The allocation state illustrated in FIG. 3 corresponds to the scheduling information 111 illustrated in FIG. 2. Furthermore, in FIG. 3, the vertical axis indicates the node ID that identifies the plurality of computation nodes 200 and the horizontal axis indicates time series.

For example, the job whose job ID is "1" is allocated to the computation node 200 whose node ID is "0x001" to be executed for the period from 15:00 to 19:00 on February 22.

By referring to the allocation state illustrated in FIG. 3, the allocation state of a job during an optional time in each of the computation nodes 200 may be grasped.

The job scheduler 110 then refers to the scheduling information 111 and requests the computation node 200 as the allocation destination to execute the job, at the time scheduled in the scheduling information 111 (scheduled start time), for example. It is to be noted that the function as the job scheduler 110 is known, and thus the detailed description thereof is omitted.

In the parallel computer system 1 according to the present embodiment, out of jobs received by the job management node 100, for example, a job with a degree of priority with which the job does not have to be executed by stopping all other jobs under execution but has to be started with the highest priority among jobs waiting to be executed is referred to as a high-priority job.

When a high-priority job is entered from the user terminal 500 or the like, the job scheduler 110 transmits (issues, notifies) a notification (high-priority job entering notification) indicating that this high-priority job has been entered to the power supply management node 300 (job information acquisition unit 303; see FIG. 6) which will be described later.

Figure 4:
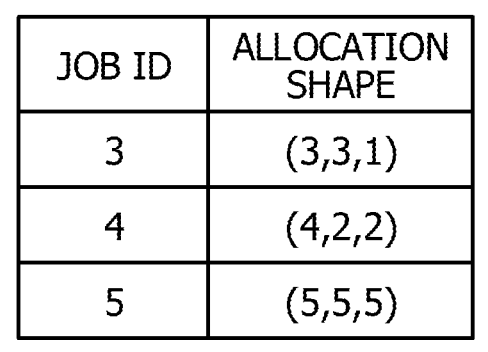

FIG. 4 is a diagram illustrating a data configuration of a high-priority job entry notification in the parallel computer system 1 as an example of the embodiment.

The high-priority job entry notification illustrated in FIG. 4 is configured such that a job ID is associated with an allocation shape. The high-priority job entry notification illustrated in FIG. 4 indicates three high-priority jobs whose job IDs are "3", "4", and "5".

The allocation shape indicates the configuration of the computation nodes 200 demanded for executing the job identified by the job ID.

The allocation shape is represented as a combination of coordinate values of the axis directions in N-dimensional coordinates, for example.

The high-priority job entry notification illustrated in FIG. 4 indicates an example in which a plurality of computation nodes 200 arranged in a three-dimensional rectangular parallelepiped shape is the job allocation destination. That is to say, the allocation shape illustrated in FIG. 4 has the format of a rectangular coordinate system of a three-dimensional space (N=3) of (x, y, z) and represents the length of each side in the direction of x, y, or z.

The allocation shape is information indicating the size and the shape of an aggregate (a mass of computation nodes) that forms a rectangular parallelepiped in a case where a number of computation nodes 200 demanded for executing the job are connected to form the rectangular parallelepiped.

Theses values for x, y, and z then represent the side lengths of a cube being the aggregate of the computation nodes 200 (a group of request nodes, a mass of computation nodes) demanded for executing the job. Furthermore, the product of these values for x, y, and z represents the number of computation nodes 200 (number of request nodes) demanded for executing the job. It is to be noted that out of the side lengths of the cube represented by the allocation shape, the largest value is referred to as "the largest side length" in some cases. Furthermore, in the description below, the largest side length of the high-priority job is represented by using a sign L in some cases.

In the high-priority job entry notification illustrated in FIG. 4, for example, the allocation shape of the high-priority job whose job ID is "2" is (4, 2, 2), and thus the largest side length thereof is "4" (L=4). Furthermore, for processing this high-priority job whose job ID is "2", in the computation node group 202, a group of computation nodes 200 formed of 4×2×2=16 pieces of computation nodes 200 that are connected so as to form a rectangular parallelepiped is demanded.

Furthermore, in the job scheduler 110, the time demanded for power shutdown processing and the time demanded for power activation processing in the computation nodes 200 are preset in a power supply control setting information storage unit 309 (see FIG. 10), which will be described later, as parameters, for example.

During the periods of power shutdown processing and the power activation processing in a computation node 200, the job scheduler 110 does not perform (inhibits) job allocation to that computation node 200. In the description below, the periods during which job allocation to the computation node 200 is inhibited is referred to as a job allocation inhibiting period in some cases.

In a case where the job allocation inhibiting period of the computation node 200 targeted for power shutdown is equal to the sum of the time demanded for power shutdown processing and the time demanded for the power activation processing, there is a risk that the power activation processing of that computation node 200 is not completed before the scheduled start time of execution for the job allocated to that computation node 200. For this reason, the job allocation inhibiting period is desirably longer than the sum of the time demanded for power shutdown processing and the time demanded for the power activation processing.

In the description below, the time demanded for the power shutdown processing in the computation node 200 is referred to as a "time T" in some cases. This time T demanded for the power shutdown processing is stored in the power supply control setting information storage unit 309. The time T demanded for the power shutdown processing and the time demanded for power activation of the computation node 200 are read from the power supply control setting information storage unit 309 by the computation node management unit 301 at the time of activation of the power supply management node 300, for example.

Furthermore, in the power activation processing of the computation node 200, a case where a period longer than assumed is demanded is conceivable. That is to say, there is a case where a time longer than the "time demanded for the power activation processing" set as a parameter is taken for the power activation processing of the computation node 200. In such a case, there is a risk that the start of execution of a job allocated to a time immediately after the job allocation inhibiting period fails. When seen by the user, such a failure in the start of execution of a job in the computation node 200 means that the job is not executed at the scheduled start time of execution that has been presented by the job scheduler 110, leading to not only lowering of a job throughput but also user frustration.

For this reason, the job scheduler 110 may set a margin in the job allocation inhibiting period. By setting this margin, a failure in the start of execution of a job in the computation node 200 is able to be avoided.

(c) Power Supply Management Node 300

Figure 5:
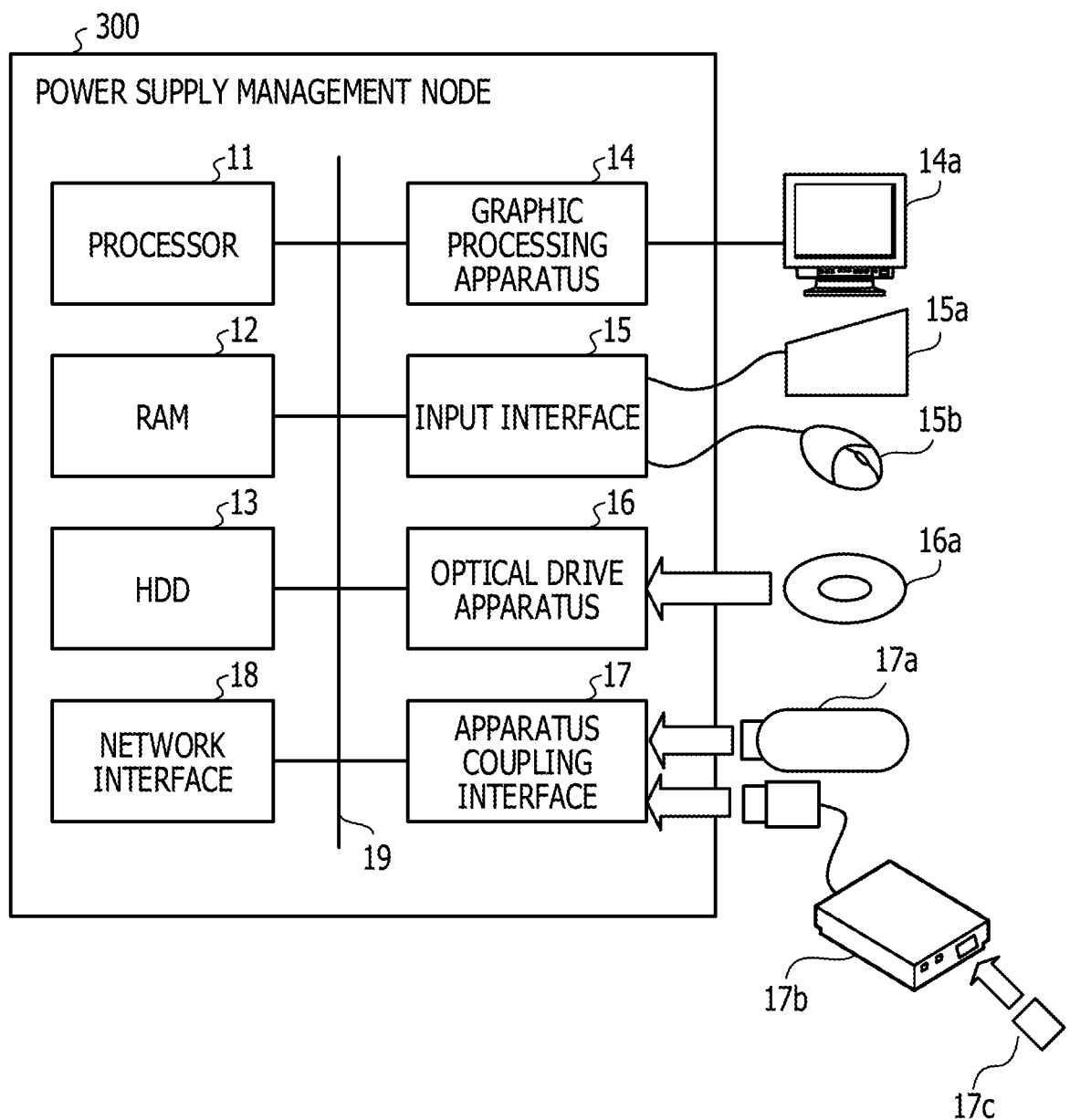
FIG. 5 is a block diagram illustrating a hardware configuration of a power supply management node in the parallel computer system as an example of the embodiment.

FIG. 5 is a block diagram illustrating a hardware configuration of the power supply management node 300 in the parallel computer system 1 as an example of the embodiment.

The power supply management node 300 controls turning on and off the power supply of each of the computation nodes 200 included in the computation node group 202 individually, via the power supply control apparatus 400.

The power supply management node 300 is configured as an information processing apparatus, and as illustrated in FIG. 5, includes a processor 11, a RAM 12, an HDD 13, a graphic processing apparatus 14, an input interface 15, an optical drive apparatus 16, an apparatus coupling interface 17, and a network interface 18 as constituent elements, for example. These constituent elements 11 to 18 are configured to be intercommunicable via a bus 19.

The RAM 12 is used as the main storage apparatus of the power supply management node 300. In the RAM 12, at least part of an OS program and an application program to be executed by the processor 11 is temporarily stored. Furthermore, in the RAM 12, various kinds of data demanded for processing performed by the processor 11 are stored. In the application program, a power supply control program executed by the processor 11 for implementing a power supply control function for the computation node 200 in the power supply management node 300 may be included.

The HDD 13 is used as an auxiliary storage apparatus of the computation node 200. In the HDD 13, an OS program, an application program, and various kinds of data are stored.

The apparatus coupling interface 17 is a communication interface for coupling a peripheral device to the computation node 200. For example, a memory apparatus 17a and a memory reader and writer 17b are able to be coupled to the apparatus coupling interface 17. The memory apparatus 17a is a non-transitory storage medium with a communication function with the apparatus coupling interface 17 embedded therein, for example, a Universal Serial Bus (USB) memory. The memory reader and writer 17b performs writing of data into a memory card 17c and reading of data from the memory card 17c. The memory card 17c is a card-type non-transitory storage medium.

The network interface 18 is coupled to the network 201. The network interface 18 performs transmission and reception of data with other computers (the computation node 200, the job management node 100) or a communication apparatus via the network 201.

The power supply control apparatus 400 is coupled to the power supply management node 300 via the apparatus coupling interface 17 or the network interface 18.

The power supply control apparatus 400 controls the power supply to each of the computation nodes 200 included in the computation node group 202. That is to say, the power supply control apparatus 400 performs power activation (turning on the power supply) and power shutdown (turning off the power supply) of an optional computation node 200 in accordance with an instruction from the power supply management node 300.

It is to be noted that a plurality of power supply control apparatuses 400 may be provided so that each of the power supply control apparatuses 400 controls a predetermined number of computation nodes 200. The configuration may be changed as appropriate to implement the control. Furthermore, the configuration and the function of the power supply control apparatuses 400 are known, and thus the detailed description thereof is omitted.

The processor 11 performs overall control of the power supply management node 300. The processor 11 may be a multi-processor. The processor 11 may be any one of a CPU, an MPU, a DSP, an ASIC, a PLD, or an FPGA. Furthermore, the processor 11 may be a combination of two or more types among the CPU, the MPU, the DSP, the ASIC, the PLD, and the FPGA.

It is to be noted that the power supply management node 300 implements the power supply management function of the computation node 200 by executing a program (node power supply management program) stored in a computer-readable non-transitory storage medium, for example. The program in which a processing content to be executed by the power supply management node 300 is written may be stored in various types of storage media. For example, a program to be executed by the power supply management node 300 may be stored in the HDD 13. The processor 11 loads at least part of the program inside the HDD 13 into the RAM 12 and executes the loaded program.

Furthermore, the program to be executed by the power supply management node 300 (processor 11) may be stored in a non-transitory portable storage medium such as an optical disk 16a, the memory apparatus 17a, or the memory card 17c. The program stored in the portable storage medium becomes executable after being installed in the HDD 13 under the control of the processor 11, for example. Furthermore, the processor 11 may directly read the program from the portable storage medium and execute the read program.

Then, in the power supply management node 300, the processor 11 executes the node power supply management program and thereby functions as the computation node management unit 301.

The computation node management unit 301 manages the power supply to each of the computation nodes 200 included in the computation node group 202. That is to say, the computation node management unit 301 controls power activation (turning on the power supply) and power shutdown (turning off the power supply) of each of the computation nodes 200 included in the computation node group 202 via the power supply control apparatus 400.

Furthermore, the computation node management unit 301 implements energy saving control that reduces power consumption in the computation nodes 200.

When performing the energy saving control, the computation node management unit 301 identifies an idle node 200 by referring to the scheduling information 111 generated by the job scheduler 110 of the job management node 100.

In this case, the idle node 200 is a computation node 200 in which no job is under execution and no job allocation is scheduled for a predetermined period of time or longer after the current time.

In the parallel computer system 1 according to the present embodiment, the computation node management unit 301 causes the power supply of the idle node 200 in the computation node group 202 to be turned off, whereby energy saving in the system is achieved by reducing the power consumption without lowering the job throughput in the computation node group 202. In the example illustrated in FIG. 3, the power supplies of the computation nodes 200 whose node IDs are "0x003" and "0x004" may be turned off to enhance energy saving.

Figure 6:
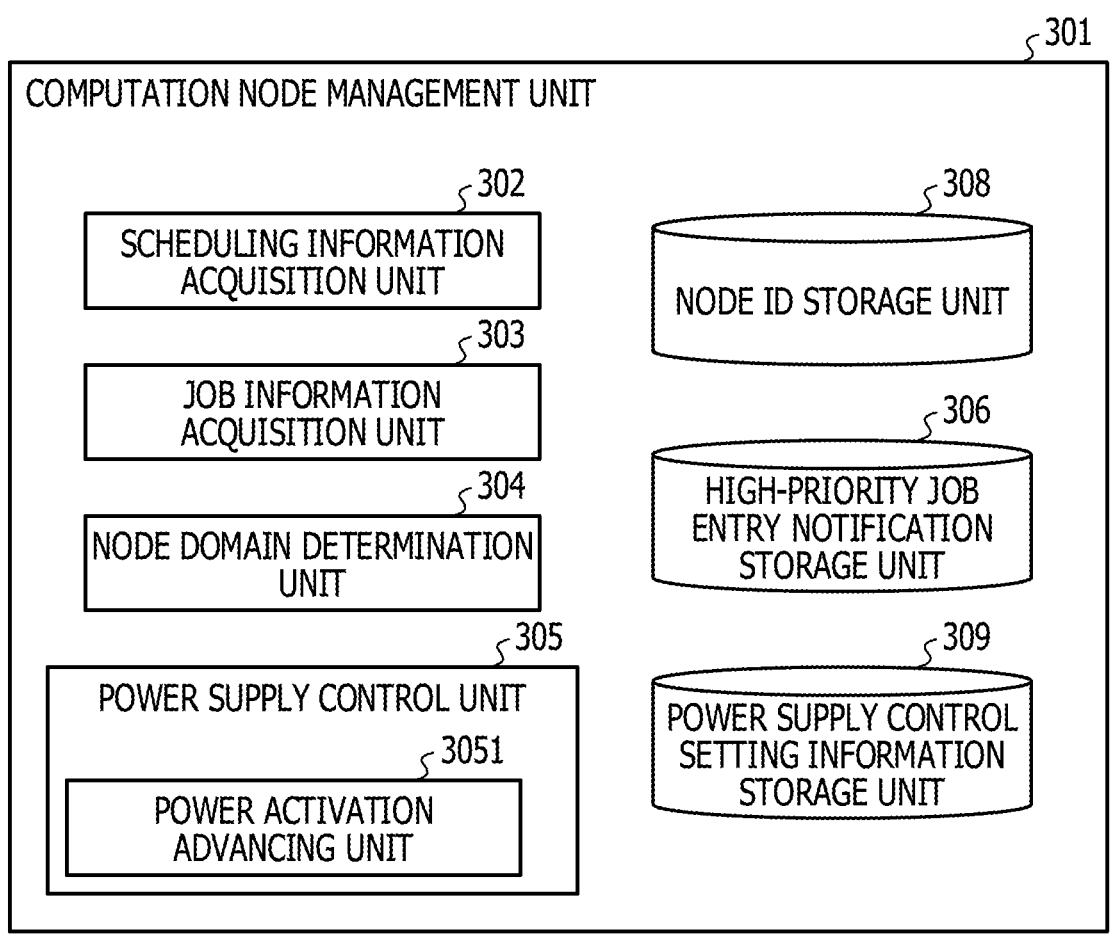
FIG. 6 is a functional block diagram illustrating a function of a computation node management unit in the parallel computer system as an example of the embodiment.

FIG. 6 is a diagram illustrating a function configuration of a computation node management unit 301 in the parallel computer system 1 as an example of the embodiment.

As illustrated in FIG. 6, the computation node management unit 301 includes functions as a scheduling information acquisition unit 302, a job information acquisition unit 303, a node domain determination unit 304, and a power supply control unit 305.

The scheduling information acquisition unit 302 acquires the scheduling information 111 created by the job scheduler 110. For example, the scheduling information acquisition unit 302 acquires the scheduling information 111 by reading the scheduling information 111 which is created by the job management node 100 and stored in the job schedule storage unit 120.

It is to be noted that the scheduling information acquisition unit 302 may acquire the scheduling information 111 by requesting the job management node 100 to transmit the scheduling information 111, for example, and implement the acquisition by making a change as appropriate.

The job information acquisition unit 303 receives a high-priority job entry notification notified from the job scheduler 110 of the job management node 100. As described above, in this high-priority job entry notification, the allocation shape is included. Referring to this high-priority job entry notification thus enables to acquire the largest side length L of the input high-priority job.

The job information acquisition unit 303 stores the received high-priority job entry notification in a high-priority job entry notification storage unit 306.

The high-priority job entry notification storage unit 306 is a storage region that stores therein the high-priority job entry notification and implemented, for example, by using a storage region of the RAM 12 or the HDD 13.

The node domain determination unit 304 sets a domain in a predetermined range centering on an under-power-shutdown node 200 or a candidate power-shutdown node 200 as an extended node range domain (management domain).

In this case, the under-power-shutdown node 200 includes a computation node 200 in a state in which the power supply is turned off and a computation node 200 being in the process of power shutdown. That is to say, a computation node 200 either in a state in which the power supply is turned off or in the process of power shutdown is referred to as an under-power-shutdown node 200.

Furthermore, the candidate power-shutdown node 200 indicates a computation node 200 that is an idle node 200 to which no job has been allocated for a predetermined period of time (for example, the time T) or longer.

In the description below, the under-power-shutdown node 200 and the candidate power-shutdown node 200 are collectively referred to as a power shutdown node 200 in some cases.

The domain in a predetermined range is a range domain in which the power shutdown node 200 is virtually extended along each axis direction in the N-dimensional coordinates in the computation node group 202, centering on the position of that power shutdown node 200.

Figure 7:
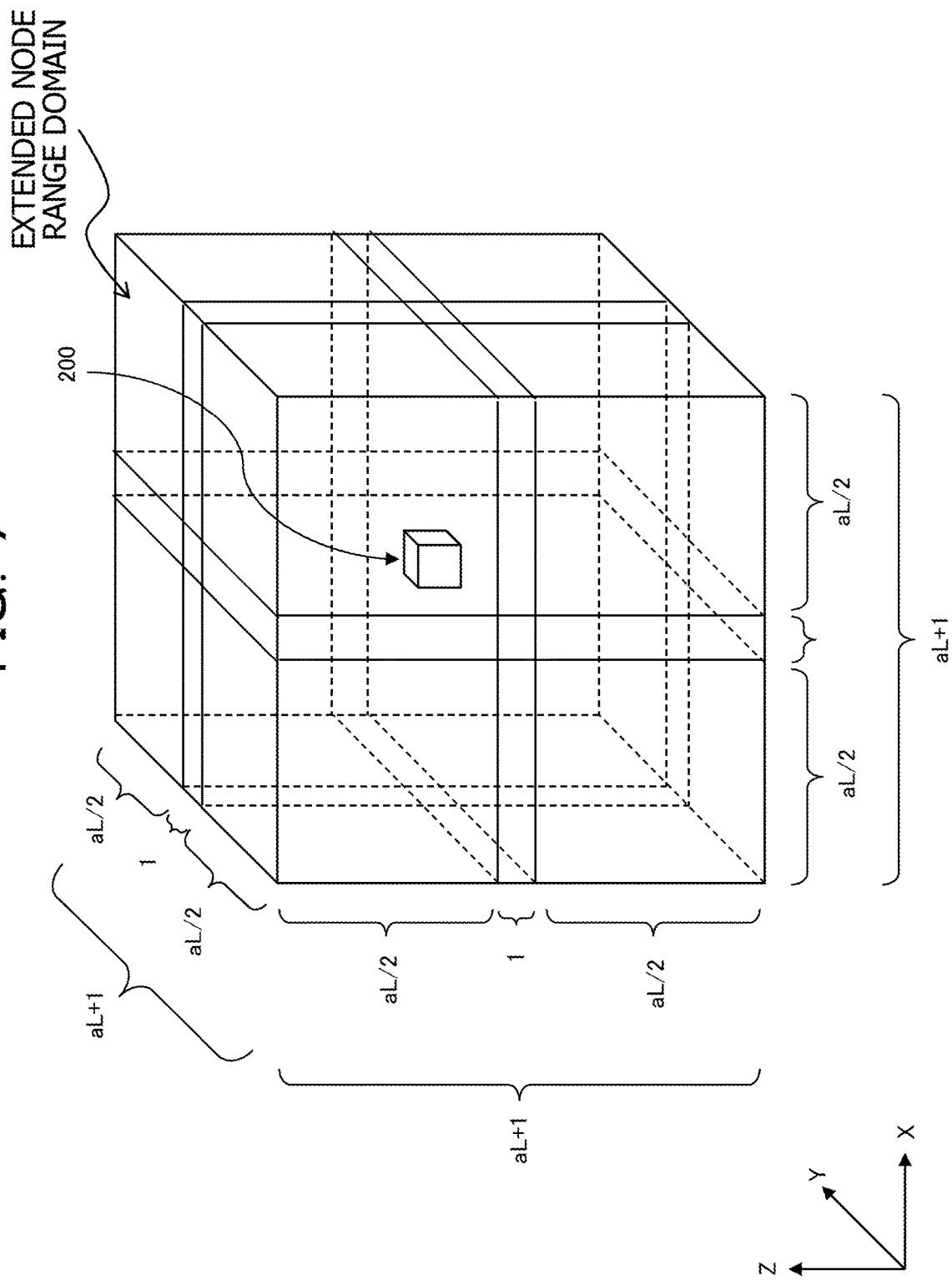
FIG. 7 is a diagram explaining an extended node range domain in the parallel computer system as an example of the embodiment.

FIG. 7 is a diagram explaining an extended node range domain in the parallel computer system 1 as an example of the embodiment.

The extended node range domain illustrated in FIG. 7 has a cubic shape centering on a power shutdown node 200 in which this power-shutdown node 200 is extended to (aL+1) times in each axis direction of x, y, and z in a three-dimensional (N=3) coordinate space. That is to say, the extended node range domain has a cubic shape centering on the power shutdown node 200 in which (aL+1) is the length of a side. It is to be noted that (aL+1) indicates the number of the computation nodes 200. The extended node range domain may be defined as a range domain obtained by extending the power shutdown node 200 by aL/2 in each of the + and − directions, along each axis direction of x, y, and z, centering on the power shutdown node 200.

"a" is desirably a positive number and a multiple of 2. In the present embodiment, an example in which a=2 holds will be described below. The extended node range domain thus has a cubic shape centering on the power shutdown node 200 in which a side has a length obtained by arranging (2L+1) pieces of computation nodes 200.

Furthermore, "L" is the largest side length with respect to the high-priority job. For example, in a case where a=2 holds and the largest side length L with respect to the high-priority job is 3, the extended node range domain has a cubic shape in which a side is aL+'=2×3+1=7. That is to say, a range domain including 343 pieces of computation nodes 200, in which seven pieces of computation nodes 200 are arranged in each axis direction of x, y, and z, makes the extended node range domain.

In the computation node group 202, in a case where a plurality of power-shutdown nodes 200 are present, the node domain determination unit 304 desirably sets the extended node range domain to each of the power shutdown nodes 200.

In the parallel computer system 1 according to the present embodiment, with respect to the computation nodes 200 included in this extended node range domain, power supply control performed by the power supply control unit 305 described later is performed.

That is to say, the extended node range domain indicates a range (domain) on which power supply control is performed for processing the entered high-priority job in the computation node group 202. The extended node range domain may be referred to as a power supply control node domain.

The node domain determination unit 304 stores the node IDs of the under-power-shutdown node 200 and the candidate power-shutdown node 200 that have been determined in the node ID storage unit 308.

As described above, the node domain determination unit 304 functions as a management domain setting unit that sets a management domain (extended node range domain) including two or more computation nodes 200 in the computation node group 202.

The node ID storage unit 308 is a storage region that stores therein the node ID of each of the computation nodes 200 composing the computation node group 202 and implemented, for example, by using a storage region of the RAM 12 or the HDD 13. The computation node management unit 301 refers to this node ID storage unit 308 at the time of activation of the power supply management node 300 to acquire the node IDs of all the computation nodes 200 composing the computation node group 202. Furthermore, in this node ID storage unit 308, the node IDs of the under-power-shutdown node 200 and the candidate power-shutdown node 200 are also recorded.

The power supply control setting information storage unit 309 is a storage region that stores therein the time demanded for the power shutdown (time T) and the time demanded for power activation (power supply control setting information) with respect to all the computation nodes 200 included in the computation node group 202 and implemented, for example, by using a storage region of the RAM 12 or the HDD 13.

As these time demanded for power shutdown and time demanded for power activation, values measured for each of the computation nodes 200 may be stored. Furthermore, as setting values (specified values), values provided from the manufacturer of the computation nodes 200 or the like may be used. Various changes thus may be made for the implementation.

The power supply control unit 305 controls turning on and off the power supply of each of the computation nodes 200 included in the computation node group 202. The power supply control unit 305 instructs the power supply control apparatus 400 to control turning on and off the power supply of each of the computation nodes 200. For example, the power supply control unit 305 transmits, to the power supply control apparatus 400, a power-on instruction or a power-off instruction together with the node ID of the computation node 200 targeted for the power supply control, thereby switching on and off of the power supply of the optional computation node 200.

Furthermore, the power supply control unit 305 has a function as a power activation advancing unit 3051 that determines the computation node 200 targeted for power activation control in the extended node range domain determined by the node domain determination unit 304.

In the computation node group 202, there is a high possibility that a high-priority job is allocated to a domain that is a specified domain composed of a plurality of computation nodes 200 and satisfies a condition (determination condition) of "the number of idle nodes ≥ the number of request nodes for a job". Thus, when the condition "the number of idle nodes≥ the number of request nodes" is satisfied in the extended node range domain, the power activation advancing unit 3051 controls to turn on the power supplies of all the computation nodes 200 included in that extended node range domain.

That is to say, on the computation nodes 200 that are present within this extended node range domain and whose power supplies are turned off, the power activation advancing unit 3051 performs (power activation advancing) control to turn on the power supplies before a job (high-priority job) is allocated thereto. Furthermore, on the computation nodes 200 whose power supplies have already been turned on within the extended node range domain, the power activation advancing unit 3051 performs control to maintain the power-on state.

The power activation advancing unit 3051 refers to the scheduling information 111 read from the job schedule storage unit 120 to count the number of idle nodes included in the extended node range domain. The power activation advancing unit 3051 sets the number of the computation nodes 200 in which no job is executed at the current time to the number of idle nodes, for example.

For example, in the example illustrated in FIG. 3, at the point of 15:00 on February 22, three computation nodes 200 whose node IDs are 0x002, 0x003, and 0x004 are the idle nodes 200. That is to say, the number of the idle nodes at the point of 15:00 on February 22 is 3.

In the description below, the domain that is an extended node range domain and satisfies the condition "the number of idle nodes ≥ the number of request nodes" is referred to as a qualified extended node range domain in some cases.

With respect to the computation nodes 200 that are present within the qualified extended node range domain as described above, the power activation advancing unit 3051 performs control so as to perform power activation of the computation nodes 200 whose power supplies are shut down and inhibit the power shutdown of the candidate power-shutdown node 200.

That is to say, the power activation advancing unit 3051 functions as a power activation advancing unit that turns on the power supplies of the computation nodes 200 that are present within the qualified extended node range domain and whose power supplies are turned off before a job (high-priority job) is allocated thereto. Furthermore, on the computation nodes 200 whose power supplies have already been turned on in the qualified extended node range domain, the power activation advancing unit 3051 performs control to maintain the power-on state.

With this, the power activation advancing unit 3051 turns on the power supplies of all the computation nodes 200 included in the qualified extended node range domain.

The power activation advancing unit 3051 transmits, to the power supply control apparatus 400, a signal (instruction) that specifies the computation nodes 200 and instructs to turn on the power supply or maintain the power-on state, thereby performing power supply control of each of the computation nodes 200.

In the description below, out of the computation nodes 200 included in the qualified extended node range domain, the computation nodes 200 whose power supplies are shut down and the candidate power-shutdown nodes 200 are referred to as power-on control target nodes 200 in some cases.

Figure 8A:
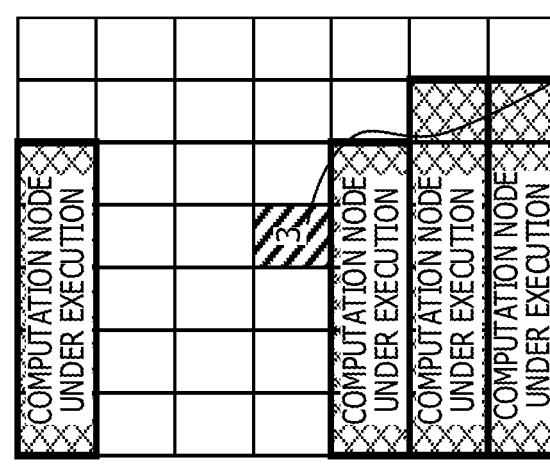
FIGS. 8A, 8B, and 8C each are a diagram explaining a determination method of a qualified extended node range domain that is performed by a power activation advancing unit in the parallel computer system as an example of the embodiment.
Figure 8B:
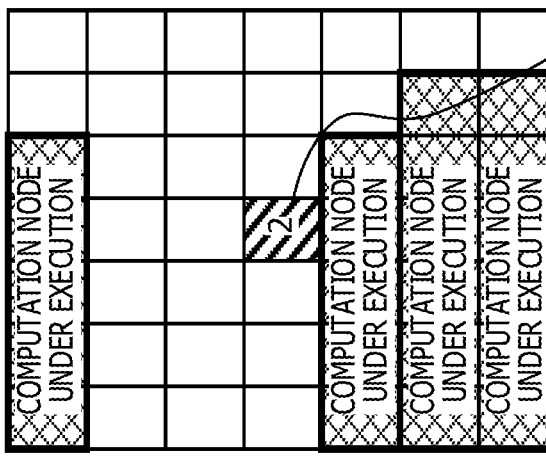
Figure 8C:
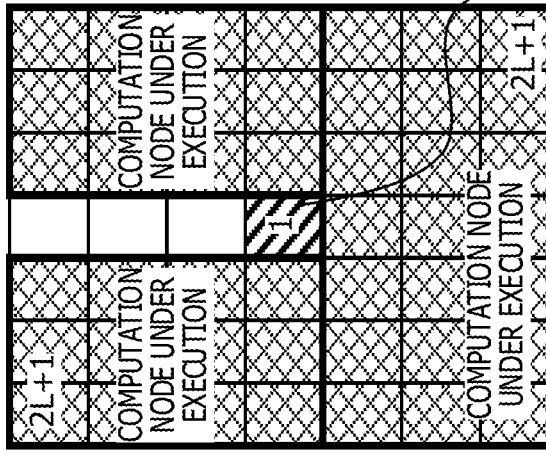

FIGS. 8A, 8B, and 8C each are a diagram explaining a determination method of a qualified extended node range domain that is performed by the power activation advancing unit 3051 in the parallel computer system 1 as an example of the embodiment.

These FIGS. 8A, 8B, and 8C each illustrate the extended node range domain in two-dimensional coordinates that is formed as a range including 7×7=49 pieces of computation nodes 200 for the sake of convenience. Furthermore, in each of these extended node range domains, a power shutdown node 200 (node IDs=1, 2, or 3) is positioned in the center.

The extended node range domain (domain 1) illustrated in FIG. 8A is formed as a range including 49 pieces of computation nodes 200 centering on the power shutdown node 200 with the node ID=1, in which the number of the idle nodes is 4. The extended node range domain (domain 2) illustrated in FIG. 8B is formed as a range including 49 pieces of computation nodes 200 centering on the power shutdown node 200 with the node ID=2, in which the number of the idle nodes is 27. The extended node range domain (domain 3) illustrated in FIG. 8C is formed as a range including 49 pieces of computation nodes 200 centering on the power shutdown node 200 with the node ID=3, in which the number of the idle nodes is 27.

When a high-priority job is entered, the power activation advancing unit 3051 compares the number of the request nodes and the number of the idle nodes in each of the extended node range domain and determines the extended node range domain in which the number of the idle nodes is higher than the request nodes as the qualified extended node range domain.

For example, when a high-priority job for which the number of the request nodes is "16" is entered, the power activation advancing unit 3051 compares this number of the request nodes "16" and the number of the idle nodes in each of the extended node range domain. In the example illustrated in FIG. 8, the extended node range domains (domains 2 and 3) illustrated in FIGS. 8B and 8C in which the number of the idle nodes is 27 are determined as the qualified extended node range domains.

With respect to the computation nodes 200 included in the qualified extended node range domain, the power activation advancing unit 3051 transmits, to the power supply control apparatus 400, the node IDs of the computation nodes 200 whose power supplies are shut down together with the power-on instruction.

Furthermore, with respect to the computation nodes 200 included in the qualified extended node range domain, the power activation advancing unit 3051 causes the candidate power-shutdown nodes 200 to maintain the power-on state by inhibiting the power shutdown. For example, the power activation advancing unit 3051 transmits, to the power supply control apparatus 400, the node IDs of these candidate power-shutdown nodes 200 together with the power-on instruction. It is to be noted that the power activation advancing unit 3051 may transmit, to the power supply control apparatus 400, the node IDs of these candidate power-shutdown nodes 200 together with instructions to maintain the power-on state or instructions to inhibit the power-off.

With this, the power activation advancing unit 3051 causes the power-on control target nodes 200 included in the qualified extended node range domain to be excluded from the power shutdown targets and maintained in the power-on state. With this, when a high-priority job is allocated to the qualified extended node range domain, the power supply of the computation node 200 to which the job has been allocated is not turned off, whereby that computation node 200 is able to quickly process the allocated high-priority job.

Furthermore, the computation node management unit 301 has a function to refer to the scheduling information 111 with respect to the power shutdown node 200 to check whether a job is allocated to the power shutdown node 200 within the time T. When no job is allocated to the power shutdown node 200, the computation node management unit 301 transmits, to the job scheduler 110, a request (instruction) to extend the job allocation inhibiting time with respect to that power shutdown node 200 by the time T.

(B) Operation

Figure 9:
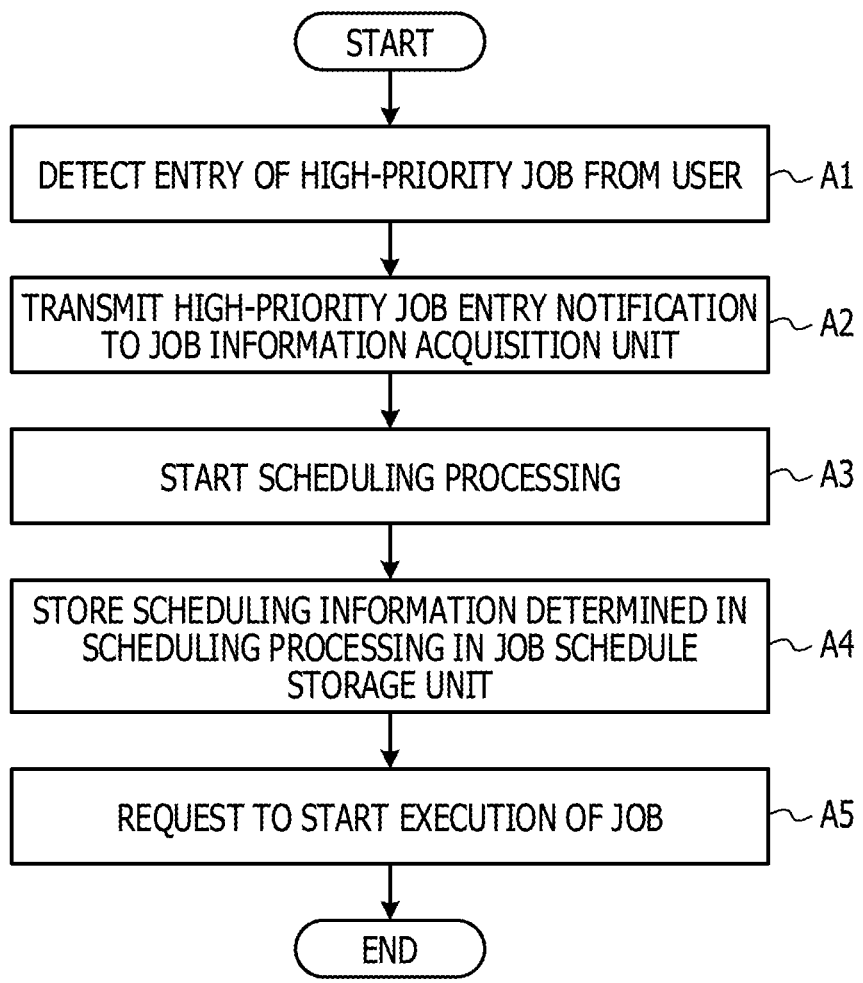
FIG. 9 is a flowchart explaining processing of a job scheduler when a high-priority job is entered in the parallel computer system as an example of the embodiment.

Processing performed by the job scheduler 110 when a high-priority job is entered in the parallel computer system 1 as an example of the embodiment, which is configured as above, will be described with reference to FIG. 10, in accordance with the flowchart (steps A1 to A5) illustrated in FIG. 9. Furthermore, FIG. 10 is a diagram explaining information transmitted and received in the parallel computer system 1 according to the present embodiment.

At step A1, the job scheduler 110 detects entry of a high-priority job from the user terminal 500 (see the arrow P1 in FIG. 10).

At step A2, the job scheduler 110 transmits a high-priority job entry notification to the job information acquisition unit 303 of the computation node management unit 301 (see the arrow P2 in FIG. 10). The job information acquisition unit 303 stores the received high-priority job entry notification in the high-priority job entry notification storage unit 306 (see the arrow P3 in FIG. 10).

At step A3, the job scheduler 110 performs scheduling of the entered high-priority job. It is to be noted that schedule processing of the job in the job scheduler 110 may be implemented by various known methods, and thus the detailed description thereof is omitted. With this job schedule processing that is performed by the job scheduler 110, the scheduling information 111 is generated (determined).

It is to be noted that when performing the job scheduling processing, the job scheduler 110 does not allocate a job to the computation node 200 for which job allocation is inhibited.

At step A4, the job scheduler 110 stores the scheduling information 111 determined in the job schedule processing performed at step A3 in the job schedule storage unit 120 (see the arrow P4 in FIG. 10).

At step A5, the job scheduler 110 makes a request to start execution of a job with respect to the computation node 200 being the allocation destination at the scheduled time in accordance with the scheduling information 111 (see the arrow P5 in FIG. 10). Then, the processing is completed.

It is to be noted that the above-described processing is processing in a case where a high-priority job is entered. In a case where a normal job that is not a high-priority job is entered, the procedures at steps A1 and A2 are omitted, and the procedures at steps A3 to A5 are performed.

Next, processing performed by the computation node management unit 301 in the parallel computer system 1 as an example of the embodiment will be described with reference to FIG. 10, in accordance with the flowchart (steps B1 to B19) illustrated in FIGS. 11 and 12. It is to be noted that FIG. 11 illustrates the procedures at steps B1 to B9 and FIG. 12 illustrates the procedures at steps B10 to B19.

Figure 11:
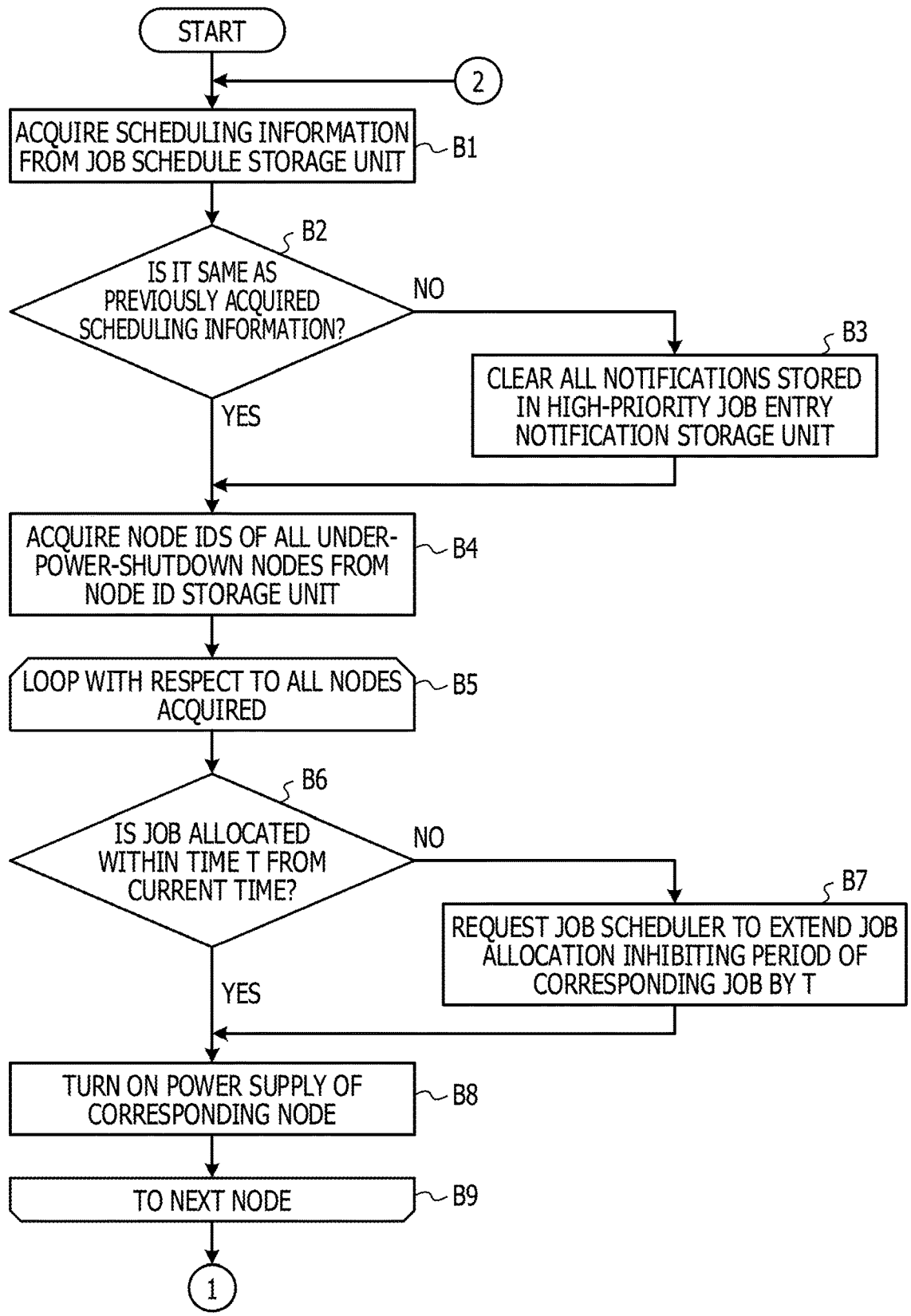
FIG. 11 is a flowchart explaining processing performed by the computation node management unit in the parallel computer system as an example of the embodiment.
Figure 12:
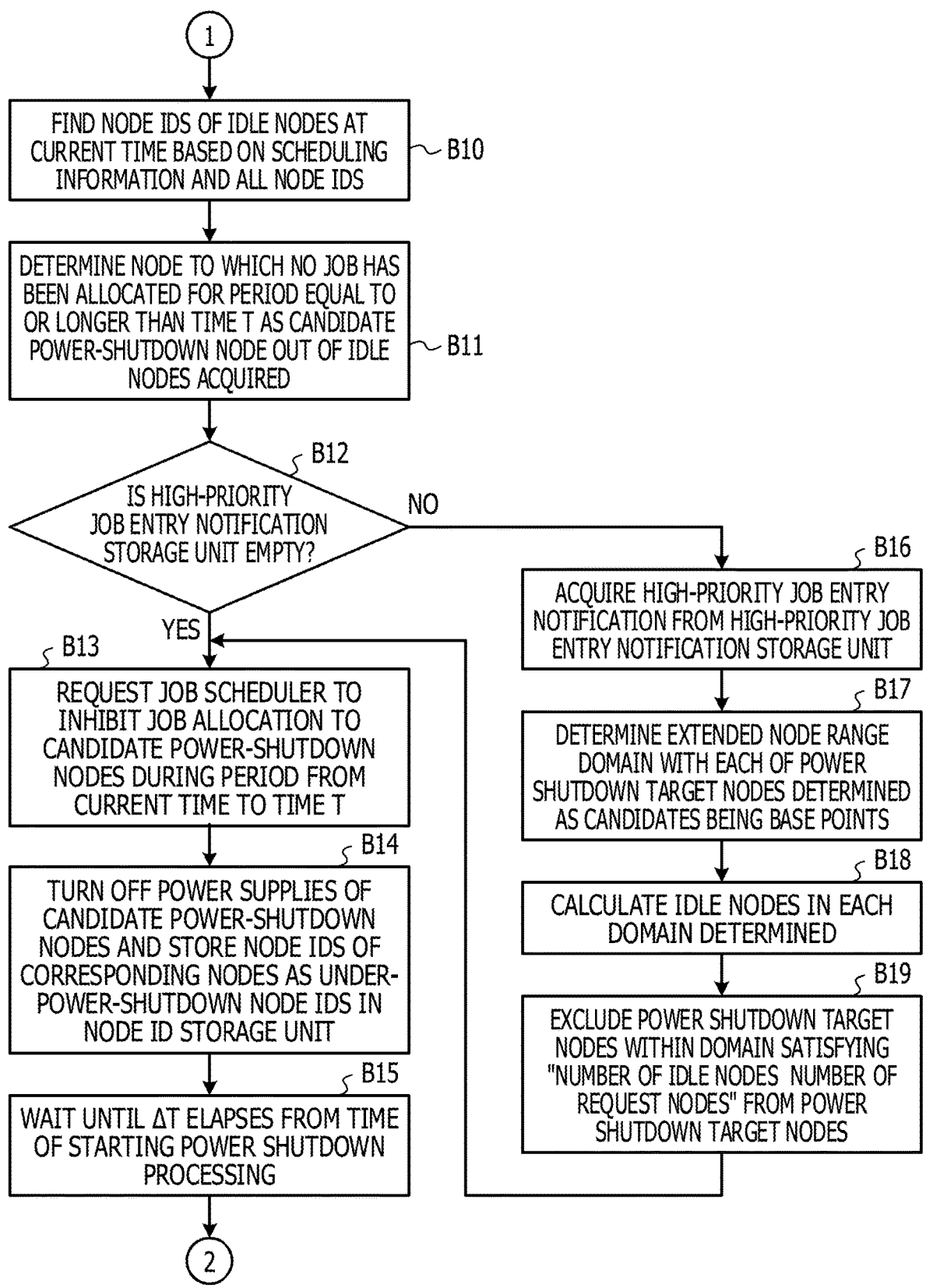
FIG. 12 is a flowchart explaining processing performed by the computation node management unit in the parallel computer system as an example of the embodiment.

At step B1 in FIG. 11, the scheduling information acquisition unit 302 acquires the scheduling information 111 from the job schedule storage unit 120 (see the arrow P6 in FIG. 10). The acquired scheduling information 111 is stored in a storage region of the RAM 12 or the like.

At step B2 in FIG. 11, the scheduling information acquisition unit 302 compares the acquired scheduling information 111 with previously acquired scheduling information 111 to check whether these are the same. Specifically, the scheduling information acquisition unit 302 checks whether the job IDs, the allocation target node IDs, the scheduled start times, and the scheduled end times are the same with respect to the scheduling information 111 acquired at step B1 and the previously acquired scheduling information 111.

As a result of the check, in a case where the newly acquired scheduling information 111 is the same as the previously acquired scheduling information 111 (see the YES route at step B2), the processing proceeds to step B4 in FIG. 11.

At step B4, the power activation advancing unit 3051 acquires the node IDs of all the under-power-shutdown nodes 200 and the candidate power-shutdown nodes 200 from the node ID storage unit 308 (see the arrow P7 in FIG. 10).

By contrast, as a result of the check at step B2, in a case where the newly acquired scheduling information 111 is not the same as the previously acquired scheduling information 111 (see the NO route at step B2), the processing proceeds to step B3 in FIG. 11.

At step B3, all the high-priority job entry notification stored in the high-priority job entry notification storage unit 306 are deleted (cleared), and then the processing proceeds to step B4.

Thereafter, at step B5 in FIG. 11, with respect to all the computation nodes 200 corresponding to the node IDs acquired at step B4, loop processing in which the control procedures up to step B9 in FIG. 11 are repeated is started.

At step B6 in FIG. 11, the power supply control unit 305 refers to the scheduling information 111 to check the scheduled start time of the job allocated to the corresponding computation node 200. The power activation advancing unit 3051 checks whether the job has been allocated to that computation node 200 within the time T from the current time.

As a result of the check, in a case where the job has been allocated to the corresponding computation node 200 within the time T from the current time (see the YES route at step B6), the processing proceeds to step B8 in FIG. 11. At this step B8, the power supply control unit 305 turns on the power supply of that computation node 200 (see the arrow P8 in FIG. 10).

By contrast, as a result of the check at step B6, in a case where the job has not been allocated to that computation node 200 within the time T from the current time (see the NO route at step B6), the processing proceeds to step B7 in FIG. 11.

At step B7, the computation node management unit 301 (power supply control unit 305) transmits, to the job scheduler 110, a request (instruction) to extend the job allocation inhibiting time with respect to that computation node 200 by the time T. The job scheduler 110 causes the extension of the job allocation inhibiting time to be reflected on the scheduling information 111. Thereafter, the control proceeds to step B9 in FIG. 11.

At step B9, loop-end processing corresponding to step B4 is performed. At this point, when processing with respect to all the computation nodes 200 corresponding to the node IDs acquired at step B4 has been completed, the control proceeds to step B10 in FIG. 12.

At step B10, the node domain determination unit 304 detects the idle nodes 200 at the current time based on the scheduling information 111 and the node IDs of all the computation nodes 200, and acquires these node IDs.

At step B11 in FIG. 12, the node domain determination unit 304 determines the computation node 200 to which no job has been allocated for the period equal to or longer than the time T as the candidate power-shutdown node 200, out of the idle nodes 200 detected at step B10.

The node domain determination unit 304 stores the node ID of the candidate power-shutdown node 200 in the node ID storage unit 308 (see the arrow P9 in FIG. 10).

It is to be noted that it is desirable to quickly delete, from the RAM 12, the node IDs of the computation nodes 200 that have not been determined as the candidate power-shutdown nodes 200 at step B11 out of the idle nodes 200 detected at step B10. This enables to efficiently use the RAM 12.

At step B12 in FIG. 12, the job information acquisition unit 303 checks with the high-priority job entry notification storage unit 306 whether the high-priority job entry notification is stored therein. That is to say, the job information acquisition unit 303 checks whether the high-priority job entry notification storage unit 306 is empty.

As a result of the check, in a case where the high-priority job entry notification storage unit 306 is empty (see the YES route at step B12), the processing proceeds to step B13 in FIG. 12. At step B13, the computation node management unit 301 requests the job scheduler 110 to inhibit job allocation to the candidate power-shutdown nodes 200 during the period from the current time to the time T.

At step B14 in FIG. 12, the power supply control unit 305 turns off the power supplies of the candidate power-shutdown nodes 200 via the power supply control apparatus 400 (power shutdown processing). Furthermore, the power supply control unit 305 causes the node IDs of the computation nodes 200 whose power supplies thus have been turned off to be recorded in the node ID storage unit 308 as the under-power-shutdown nodes.

At step B15 in FIG. 12, waiting is performed until the time T elapses after the power shutdown processing is started at step B14. Thereafter, the processing proceeds to step B1.

By contrast, as a result of the check at step B12, in a case where the high-priority job entry notification storage unit 306 is not empty (see the NO route at step B12), the processing proceeds to step B16 in FIG. 12. At step B16, the job information acquisition unit 303 reads the high-priority job entry notification from the high-priority job entry notification storage unit 306 and acquires the read high-priority job entry notification (see the arrow P10 in FIG. 10).

At step B17 in FIG. 12, the node domain determination unit 304 determines the extended node range domain with each of the candidate power-shutdown nodes 200 identified at step B11 serving as base points.

At step B18 in FIG. 12, the power activation advancing unit 3051 refers to the scheduling information 111 to check (calculate) the idle nodes included in the extended node range domain determined at step B17.

At step B19 in FIG. 12, the power activation advancing unit 3051 controls to turn on the power supplies of the power shutdown target nodes 200 (power-on control target nodes 200) within the extended node range domain that satisfies the condition "the number of idle nodes≥ the number of request nodes for a job".

That is to say, the power activation advancing unit 3051 controls to turn on the power supplies of the computation nodes 200 that are present within this extended node range domain and whose power supplies are turned off before a job (high-priority job) is allocated thereto. Furthermore, the power activation advancing unit 3051 controls the computation nodes 200 whose power supplies have already been turned on within the extended node range domain to maintain the power-on state. Thereafter, the processing proceeds to step B13.

(C) Effect

As described above, according to the parallel computer system 1 as an example of the embodiment, when a high-priority job is entered, the node domain determination unit 304 sets the extended node range domain being a predetermined range domain centering on the power shutdown node 200 in the computation node group 202.

Thereafter, the power activation advancing unit 3051 controls to turn on the power supplies of all the computation nodes 200 included in the extended node range domain that satisfies the condition "the number of idle nodes the number of request nodes for a job" before the job is allocated thereto.

Specifically, the power activation advancing unit 3051 controls to inhibit power-off of power shutdown target nodes 200 (power-on control target nodes 200) within the extended node range domain that satisfies the condition "the number of idle nodes the number of request nodes for a job". Furthermore, the power activation advancing unit 3051 performs power activation advancing control to turn on the power supplies of the computation nodes 200 in the power-off state that are included in the qualified extended node range domain.

With this, the computation node 200 to which a high-priority job is allocated with a high possibility is maintained in the power-on state. This is able to minimize delays in the start of execution of a high-priority job, whereby the entered high-priority job is quickly processed and the processing performance is improved.

The job management node 100 and the power supply management node 300 are provided as separate information processing apparatuses, thereby separating the processing flow of the job scheduler 110 and that of the computation node management unit 301. This cancels an overhead for the job scheduler 110 to make a request to start execution of a job, thereby minimizing lowering of a job throughput that is caused by the power-off or power activation of the computation nodes 200.

(D) Other

The disclosed techniques are not limited to the above-described embodiment and may be implemented by making various changes without departing from the scope of the present embodiment. Each of the configurations and procedures according to the present embodiment may be chosen as demanded and combined as appropriate.

For example, in the above-described embodiment, the node domain determination unit 304 sets the extended node range domain being a predetermined range domain (management domain) centering on the power shutdown node 200 in the computation node group 202. However, the embodiment is not limited thereto.

Figure 13:
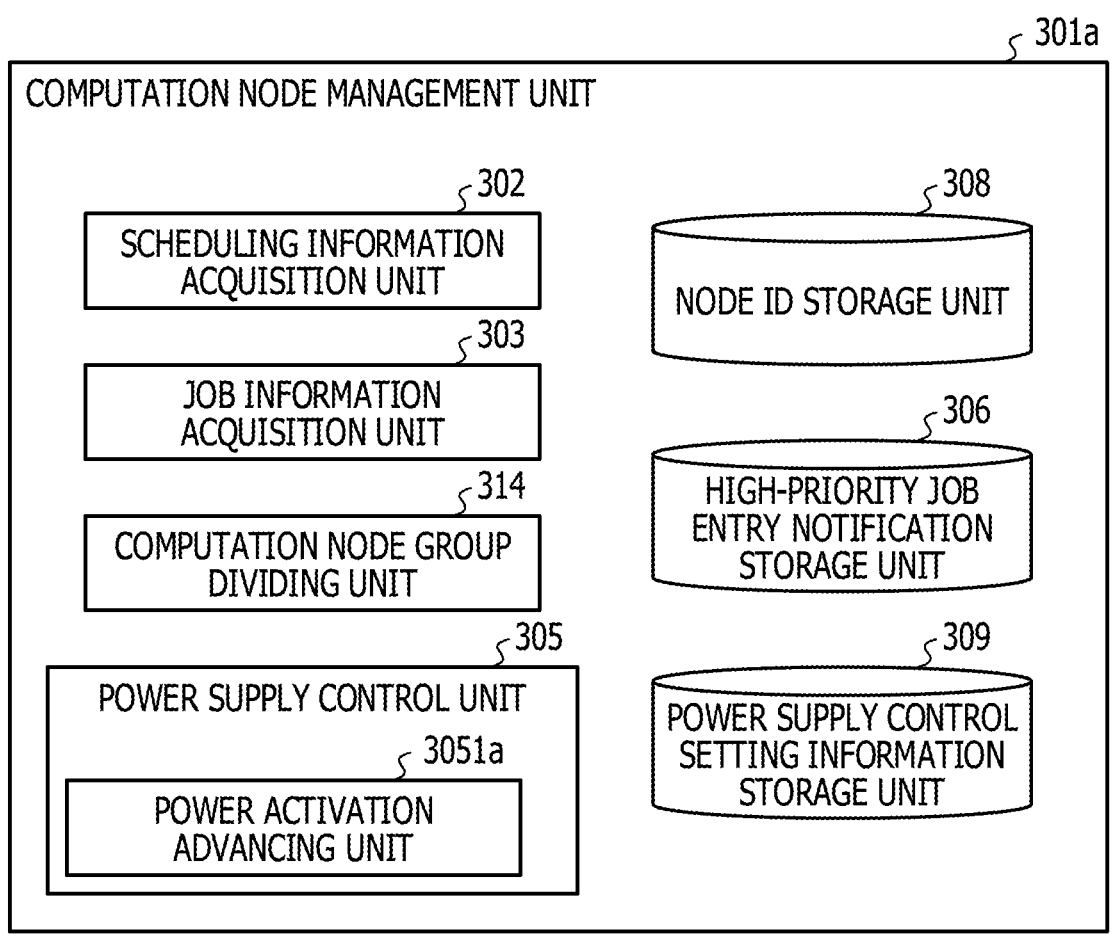
FIG. 13 is a functional block diagram illustrating a function of the computation node management unit in the parallel computer system as a variation of the embodiment.

FIG. 13 is a functional block diagram illustrating a function of the computation node management unit 301a in the parallel computer system 1 as a variation of the embodiment.

This computation node management unit 301a illustrated in FIG. 13 includes a computation node group dividing unit 314 instead of the node domain determination unit 304 of the computation node management unit 301 illustrated in FIG. 6. Furthermore, in the power supply control unit 305, a power activation advancing unit 3051a is included instead of the power activation advancing unit 3051.

It is to be noted that other parts are configured similarly to the computation node management unit 301 illustrated in FIG. 6. In FIG. 13, the same reference numerals as those described before indicate the same components, and the descriptions thereof thus will be omitted.

The computation node group dividing unit 314 divides the computation node group 202 into a plurality of blocks (management domains) having the same size as the above-described extended node range domain. That is to say, each block has a cubic shape in which a side has a length obtained by arranging (2L+1) pieces of computation nodes 200 in a three-dimensional (N=3) coordinate space, for example. In each block, $(2L+1)^3$ pieces of computation nodes 200 are included.

The computation node group dividing unit 314 thus functions as a management domain setting unit that sets a management domain (block) including two or more computation nodes 200 in the computation node group 202.

The power activation advancing unit 3051a determines the computation node 200 being the power activation control target in each block obtained by the division performed by the computation node group dividing unit 314.

The power activation advancing unit 3051a selects a block having at least one idle node 200 to which no job has been allocated for the period equal to or longer than the time T, out of the plurality of blocks formed in the computation node group 202. In the description below, such a block is referred to as a candidate block for power activation advancing control in some cases.

Thereafter, when the condition "the number of idle nodes≥ the number of request nodes" is satisfied in the selected candidate block for power activation advancing control, the power activation advancing unit 3051a performs power activation advancing control that controls to turn on the power supply of each of the computation nodes 200 included in that candidate block for power activation advancing control.

The power activation advancing unit 3051a refers to the scheduling information 111 read from the job schedule storage unit 120 to count the number of the idle nodes included in the candidate block for power activation advancing control. The power activation advancing unit 3051a sets the number of the computation nodes 200 in which no job is executed at the current time in the candidate block for power activation advancing control to the number of idle nodes, for example.

In the description below, a domain that is a candidate block for power activation advancing control and satisfies the condition "the number of idle nodes≥ the number of request nodes" is referred to as a qualified block in some cases. There is a high possibility that a high-priority job is allocated to such a qualified block.

The power activation advancing unit 3051a performs control to turn on the power supplies of all the computation nodes 200 included in the qualified block. That is to say, on the computation nodes 200 that are present within this qualified block and whose power supplies are turned off, the power activation advancing unit 3051a performs control to turn on the power supplies before a job (high-priority job) is allocated thereto. Furthermore, on the computation nodes 200 whose power supplies have already been turned on within the qualified block, the power activation advancing unit 3051a performs control to maintain the power-on state.

That is to say, on the computation nodes 200 that are present within the qualified block and whose power supplies are turned off, the power activation advancing unit 3051a turns on the power supplies before a job (high-priority job) is allocated thereto.

Figure 14:
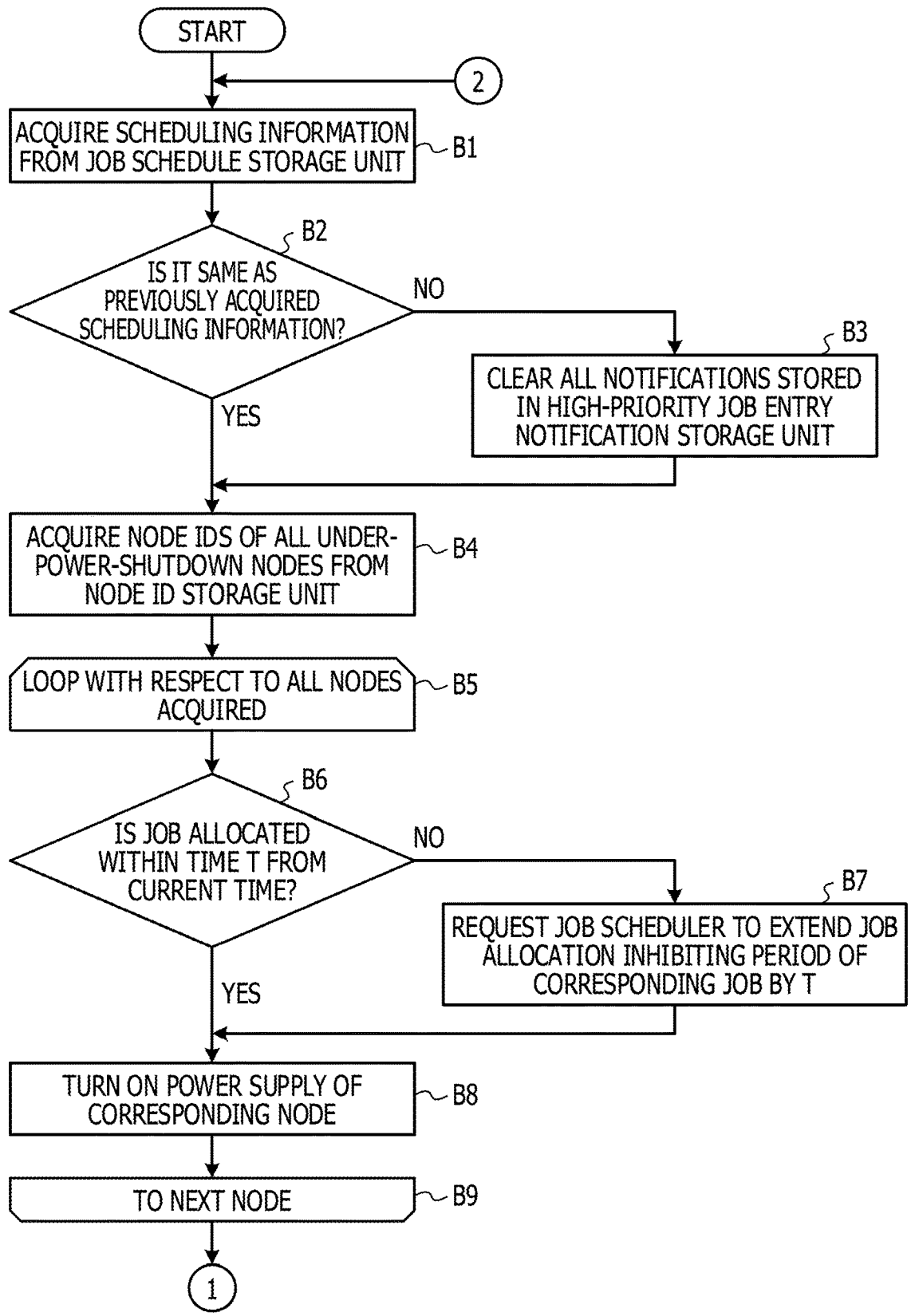
FIG. 14 is a flowchart explaining processing performed by the computation node management unit in the parallel computer system as a variation of the embodiment.
Figure 15:
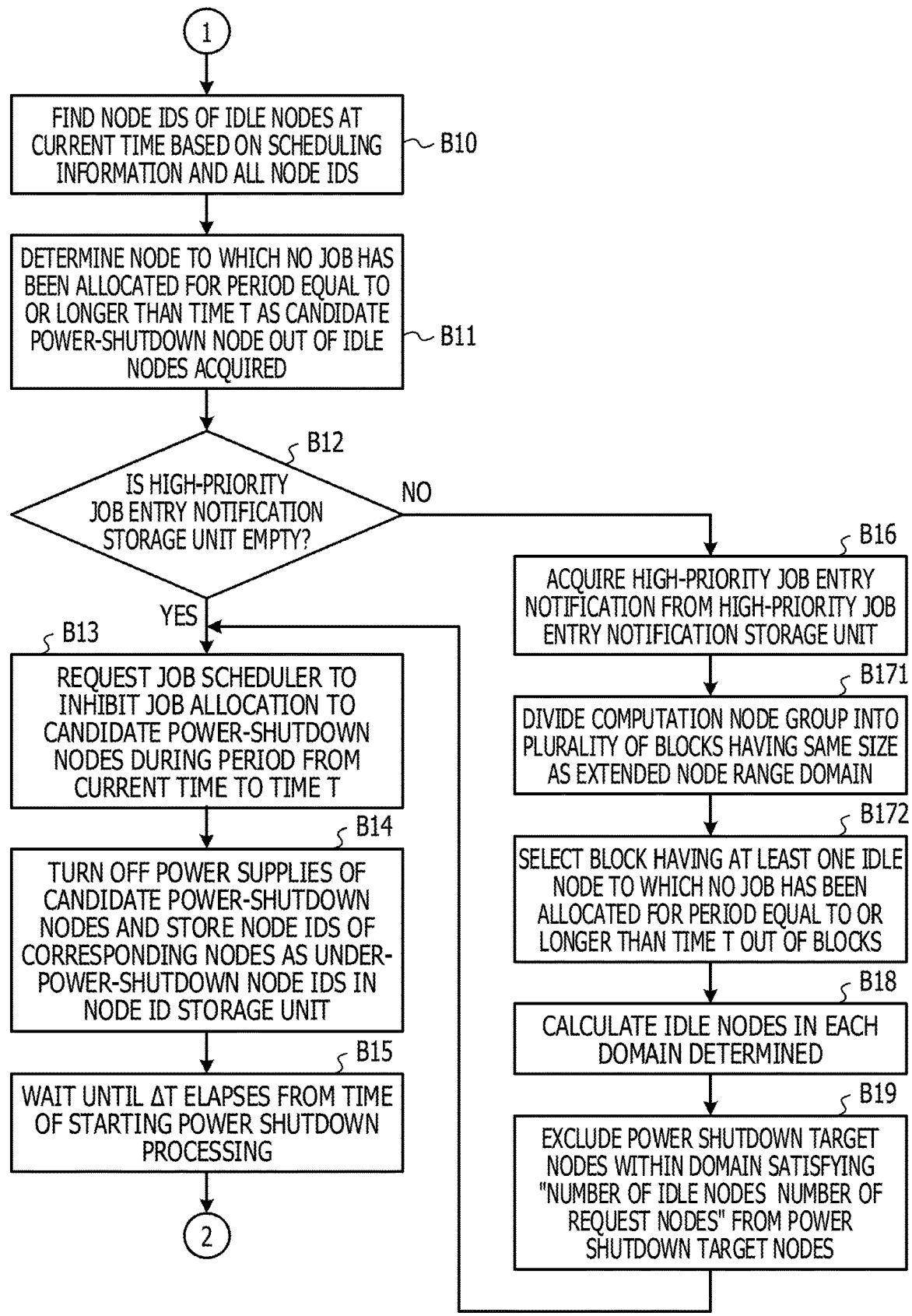
FIG. 15 is a flowchart explaining processing performed by the computation node management unit in the parallel computer system as a variation of the embodiment.

The processing performed by the computation node management unit 301 in the parallel computer system 1 as a variation of the embodiment is illustrated in the flowcharts (steps B1 to B16, B171, B172, B18, and B19) illustrated in FIGS. 14 and 15.

In FIG. 15, instead of step B17 in FIG. 12, steps B171 and B172 are included, and other steps are the same as in FIG. 12. That is to say, FIG. 14 illustrates processing of steps B1 to B9 and FIG. 15 illustrates processing of steps B10 to B16, B171, B172, B18, and B19.

In FIGS. 14 and 15, the same reference characters as those described before indicate the same steps, and the descriptions thereof thus will be omitted.

At step B171 in FIG. 15, the computation node group dividing unit 314 virtually divides the computation node group 202 into a plurality of blocks having the same size as the above-described extended node range domain. Each of the blocks has a cubic shape in which (aL+1) is the length of a side in a three-dimensional (N=3) coordinate space, for example.

At step B172 in FIG. 15, the power activation advancing unit 3051a selects a block having at least one idle node 200 to which no job has been allocated for the period equal to or longer than the time T, out of the plurality of blocks formed in the computation node group 202, as the candidate block for power activation advancing control.

At step B18 in FIG. 15, the power activation advancing unit 3051a refers to the scheduling information 111 to check the number of idle nodes included in each of the candidate blocks for power activation advancing control that have been selected at step B172.

At step B19 in FIG. 15, the power activation advancing unit 3051a controls to turn on the power supplies of the power shutdown target nodes 200 (power-on control target nodes 200) within the candidate block for power activation advancing control (qualified block) that satisfies the condition "the number of idle nodes≥ the number of request nodes for a job".

That is to say, on the computation nodes 200 that are present within this qualified block and whose power supplies are turned off, the power activation advancing unit 3051a performs control to turn on the power supplies before a job (high-priority job) is allocated thereto. Furthermore, on the computation nodes 200 whose power supplies have already been turned on within the qualified block, the power activation advancing unit 3051a performs control to maintain the power-on state. Thereafter, the processing proceeds to step B13.

The parallel computer system 1 as a variation of the embodiment as described above is also able to achieve the same operational effect as that of the parallel computer system 1 according to the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus configured to control a parallel computer system including a plurality of computation nodes, the information processing apparatus comprising:
   a memory;
   and a processor coupled to the memory and configured to:
   determine a plurality of power supply control domains by dividing the plurality of computation nodes;
   acquire scheduling information that indicates an allocation state of one or more first jobs to the plurality of computation nodes;

for each of the plurality of power supply control domains, identify, based on the scheduling information, a first number of the computation nodes each of which does not execute the one or more first jobs, receive a request to execute a second job;

identify a second number of computation nodes each of which is to be used for processing of the second job;

control to turn on power supply to a first power supply control domain of the plurality of power supply control domains based on the first number and the second number; and wherein when the first number of the first power supply control domain is greater than the second number of the first power supply control domain, the processor is configured to turn on the power supply to the first power supply control domain.

2. The information processing apparatus according to claim 1, wherein the plurality of computation nodes are arranged to form a rectangular parallelepiped in the parallel computer system, and the processor is configured to determine the plurality of power supply control domains in the rectangular parallelepiped that centers on a first computation node that is under power shutdown or is a power-shutdown candidate out of the plurality of computation nodes.

3. The information processing apparatus according to claim 2, wherein the processor is configured to determine the plurality of power supply control domains by dividing the rectangular parallelepiped into a plurality of domains that have the same size.

4. The information processing apparatus according to claim 2, wherein the processor is configured to determine the plurality of power supply control domains in accordance with the size of a mass of computation nodes formed by the computation nodes used for processing of the second job.

5. The information processing apparatus according to claim 1, wherein the processor is configured to control the first number to be equal to or greater than the second number in first the power supply control domain.

6. The information processing apparatus according to claim 1, wherein the processor is configured to control a priority of the second job to be the higher among a plurality of jobs that are waiting to be executed.

7. The information processing apparatus according to claim 1, wherein the processor is configured to allocate the second job to the computation nodes included in the first the power supply control domain.

8. A method of controlling a parallel computer system including a plurality of computation nodes, the method comprising:

determining a plurality of power supply control domains by dividing the plurality of computation nodes;

acquiring scheduling information that indicates an allocation state of one or more first jobs to the plurality of computation nodes;

for each of the plurality of power supply control domains, identifying, based on the scheduling information, a first number of the computation nodes each of which does not execute the one or more first jobs;

receiving a request to execute a second job;

identifying a second number of computation nodes each of which is to be used for processing of the second job;

controlling to turn on power supply to a first power supply control domain of the plurality of power supply control domains based on the first number and the second number; and wherein when the first number of the first power supply control domain is greater than the second number of the first power supply control domain, the power supply to the first power supply control domain is turn on.

9. The method according to claim 8, wherein the plurality of computation nodes are arranged to form a rectangular parallelepiped in the parallel computer system, and the determining determines the plurality of power supply control domains in the rectangular parallelepiped that centers on a first computation node that is under power shutdown or is a power-shutdown candidate out of the plurality of computation nodes.

10. The method according to claim 9, wherein the determining determines the plurality of power supply control domains by dividing the rectangular parallelepiped into a plurality of domains that have the same size.

11. The method according to claim 9, wherein the determining determines the plurality of power supply control domains in accordance with the size of a mass of computation nodes formed by the computation nodes used for processing of the second job.

12. The method according to claim 8, further comprising:

controlling the first number to be equal to or greater than the second number in first the power supply control domain.

13. The method according to claim 8, further comprising:

controlling a priority of the second job to be the higher among a plurality of jobs that are waiting to be executed.

14. The method according to claim 9, further comprising:

allocating the second job to the computation nodes included in the first the power supply control domain.

15. A non-transitory computer-readable storage medium storing a program that causes an information processing apparatus to execute a process of controlling a parallel computer system including a plurality of computation nodes, the process comprising:

determining a plurality of power supply control domains by dividing the plurality of computation nodes;

acquiring scheduling information that indicates an allocation state of one or more first jobs to the plurality of computation nodes;

for each of the plurality of power supply control domains, identifying, based on the scheduling information, a first number of the computation nodes each of which does not execute the one or more first jobs;

receiving a request to execute a second job; identifying a second number of computation nodes each of which is to be used for processing of the second job;

controlling to turn on power supply to a first power supply control domain of the plurality of power supply control domains based on the first number and the second number; and wherein when the first number of the first power supply control domain is greater than the second number of the first power supply control domain, the power supply to the first power supply control domain is turn on.

16. The non-transitory computer-readable storage medium according to claim 15, wherein the plurality of computation nodes are arranged to form a rectangular parallelepiped in the parallel computer system, and the determining determines the plurality of power supply control domains in the rectangular parallelepiped that centers on a first computation node that is under power shutdown or is a power-shutdown candidate out of the plurality of computation nodes.

17. The non-transitory computer-readable storage medium according to claim 16, wherein the determining determines the plurality of power supply control domains by dividing the rectangular parallelepiped into a plurality of domains that have the size.

* * * * *